United States Patent
Perreault

(10) Patent No.: US 9,535,200 B2
(45) Date of Patent: Jan. 3, 2017

(54) COMPLETE-STOKES FOURIER-DOMAIN IMAGING POLARIMETER

(71) Applicant: The Aerospace Corporation, El Segundo, CA (US)

(72) Inventor: John D Perreault, Manhattan Beach, CA (US)

(73) Assignee: The Aerospace Corporate, El Segundo, CA (US)

( * ) Notice: Subject to any disclaimer, the term of this patent is extended or adjusted under 35 U.S.C. 154(b) by 665 days.

(21) Appl. No.: 13/720,697

(22) Filed: Dec. 19, 2012

(65) Prior Publication Data

US 2014/0168772 A1    Jun. 19, 2014

(51) Int. Cl.
| | | |
|---|---|---|
| *G02B 5/30* | (2006.01) | |
| *G02B 27/28* | (2006.01) | |
| *G01J 4/00* | (2006.01) | |
| *G01J 3/28* | (2006.01) | |
| *G01J 3/447* | (2006.01) | |

(52) U.S. Cl.
CPC .......... *G02B 5/3083* (2013.01); *G01J 3/2803* (2013.01); *G01J 3/447* (2013.01); *G01J 4/00* (2013.01); *G02B 27/283* (2013.01)

(58) Field of Classification Search
CPC ......... G02B 5/32; G02B 6/2931; G02B 6/272; G02B 6/2793; G02B 2006/12107; G02B 2006/12114; G02B 5/045; G02B 27/283; G02B 6/2766; G02B 27/28; G02B 27/286; G02B 27/0972; G02B 27/1006; G02B 6/105; G02B 6/2713; G02B 6/2773; G01J 4/04; G01J 3/0208; G01J 3/0224; G01J 4/00; G01J 3/2803; G01J 3/447

USPC ........... 359/489.09, 489.01, 489.1, 489.11, 359/489.12, 489.13, 489.15, 489.16, 359/489.17, 489.2, 618, 629, 633, 634, 359/638, 489.07, 489.06, 489.08, 201.1, 359/485.02; 362/19; 353/20

See application file for complete search history.

(56) References Cited

U.S. PATENT DOCUMENTS

| | | | | |
|---|---|---|---|---|
| 5,485,272 | A * | 1/1996 | Dirksen | G03F 9/7049 356/484 |
| 5,784,163 | A * | 7/1998 | Lu | G01B 11/0608 356/495 |
| 5,822,211 | A * | 10/1998 | Barenboim et al. | 700/166 |
| 5,914,817 | A * | 6/1999 | Browning et al. | 359/634 |
| 6,034,814 | A * | 3/2000 | Otaki | G02B 21/0004 356/491 |
| 6,646,802 | B2* | 11/2003 | Yamamoto | G02B 27/283 349/96 |
| 2004/0145995 | A1* | 7/2004 | Saito | G02B 27/283 369/110.02 |
| 2005/0174573 | A1* | 8/2005 | Harvey | G01J 3/2823 356/328 |
| 2005/0237532 | A1* | 10/2005 | Beale | G01J 3/4537 356/453 |
| 2012/0170000 | A1* | 7/2012 | Imaoka et al. | 353/20 |
| 2012/0268745 | A1* | 10/2012 | Kudenov | 356/453 |

* cited by examiner

*Primary Examiner* — Scott J Sugarman
*Assistant Examiner* — Daniele Manikeu
(74) *Attorney, Agent, or Firm* — LeonardPatel PC

(57) ABSTRACT

An apparatus for simultaneously measuring linear and circular polarization components of light is provided, and contains no moving parts. The apparatus may include a prism assembly configured to receive collimated light and splits the light into different directions according to its polarization state. The apparatus may also include lenses configured to collimate light from an image plane to be analyzed by the prism assembly, or direct the light that is split by the prism assembly to different detectors or locations on an image plane.

23 Claims, 6 Drawing Sheets

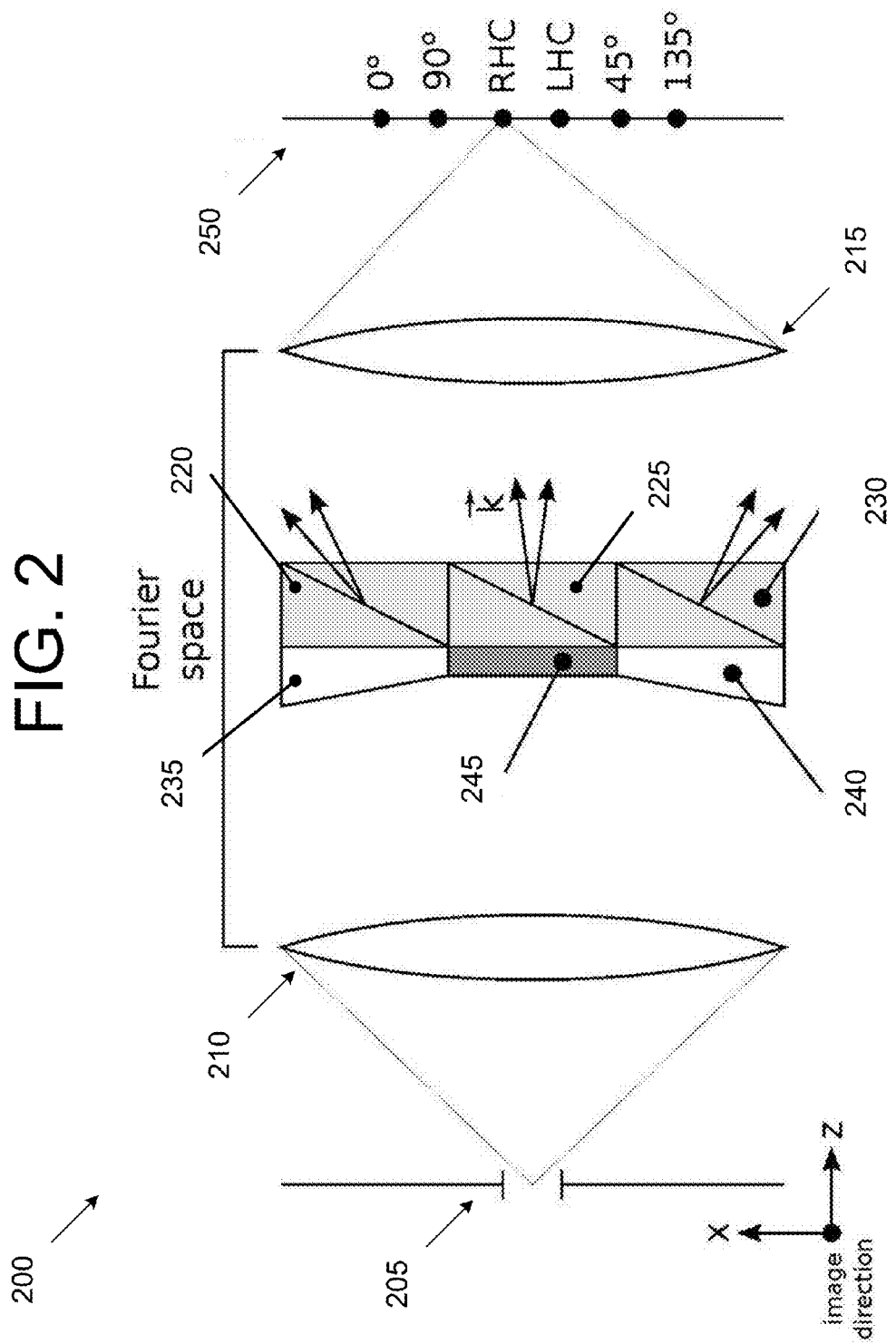

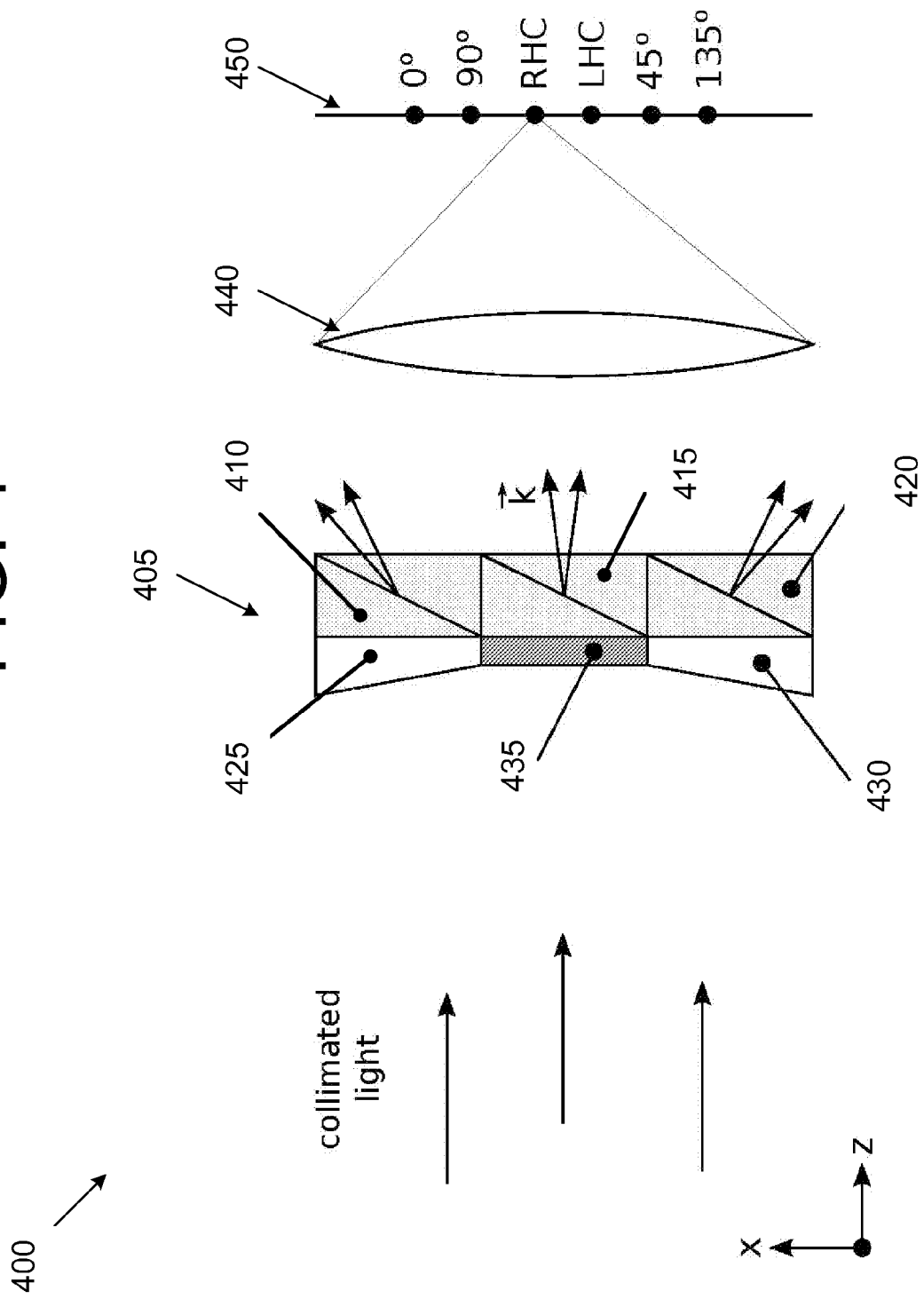

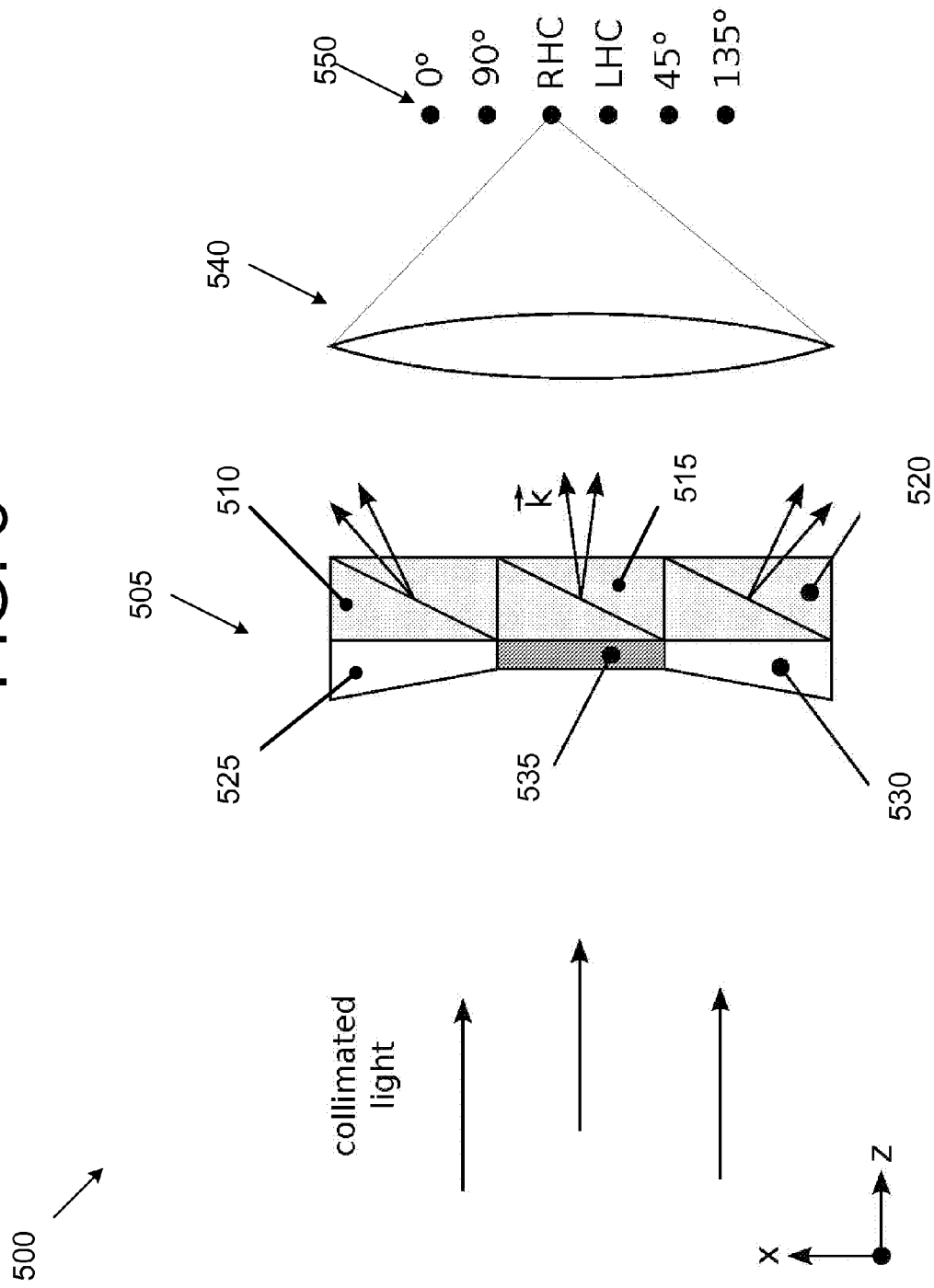

COMPLETE-STOKES FOURIER-DOMAIN IMAGING POLARIMETER

FIELD

The present invention relates to an imaging polarimeter and, more particularly, to an imaging polarimeter configured to measure linear and circular polarization components of light simultaneously with no moving parts.

BACKGROUND

Imaging polarimetry is emerging as a powerful tool for remote sensing in the defense, national security, space science, civil, and commercial domains. Polarimetry can provide information about surface texture, material composition, and molecular structure of objects or areas in a remote sensing scene.

However, there are several technical challenges to measuring polarization that need to be addressed in the context of a space-based moving platform. For example, many existing designs use wire-grid polarizers placed on top of a focal-plane array (FPA), complex arrangements of beam-splitters and polarization elements, or moving parts. The wire-grid polarizers are positioned in the image plane and need to be aligned to the FPA within 1/10 of a pixel. Any vibration of the image makes it difficult to separate polarization and intensity changes. Complex optical systems that need to be carefully aligned or that have moving parts are also not ideal for launch/flight conditions. Polarimeters that utilize photo-elastic modulators have overcome some of these challenges, but the components are fragile and will not operate properly at cryogenic temperatures required for infrared wavelengths.

Accordingly, an imaging polarimeter that utilizes concepts from Fourier optics, addressing several technical challenges associated with space-borne moving platforms, may be beneficial.

SUMMARY

Certain embodiments of the present invention may provide solutions to the problems and needs in the art that have not yet been fully identified, appreciated, or solved by current imaging devices. For example, one or more embodiments may pertain to an imaging or non-imaging polarimeter configured to measure linear and circular polarization components of light simultaneously.

In accordance with one embodiment of the present invention, an apparatus is provided. The apparatus includes two lenses and a prism assembly, which includes a plurality of prisms. A first lens collimates light from an image plane. Each of the plurality of prisms is configured to receive this collimated light and split the light into two different directions according to the polarization state. A second lens is configured to reimage the split light from each of the plurality of prisms to respective locations on an image plane. The embodiment may also include a diffraction grating that collimated light will pass through, which will enable simultaneous sensitivity to spectroscopic and polarimetric information.

In another embodiment, an apparatus is provided. The apparatus includes a prism assembly. The prism assembly includes a central prism attached to a quarter wave plate, and two outer prisms comprising a wedge. The central prism and the two outer prisms are configured to receive collimated light and split the collimated light in different directions according to the polarization state.

In yet another embodiment, an apparatus is provided. The apparatus includes a prism assembly configured to receive collimated light and split the light into different directions according to the polarization state. The apparatus also includes a lens configured to receive the split collimated light from the prism assembly and focus the split collimated light to different polarization channels on an image plane to obtain information for circular and linear polarization of the received collimated light.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2 illustrates an imaging polarimeter, according to an embodiment of the present invention.

FIG. 4 illustrates a non-imaging polarimeter, according to an embodiment of the present invention.

FIG. 5 illustrates a high-speed non-imaging polarimeter, according to an embodiment of the present invention.

DETAILED DESCRIPTION OF THE EMBODIMENTS

One or more embodiments pertain to a polarimeter that includes a plurality of Wollaston prisms (hereinafter "prisms") and a quarter-wave plate attached to a central prism configured to characterize the polarization state of the light, measuring both linear and circular components. The polarimeter separates the polarization components of light in Fourier (pupil or collimated) space, and reduces sensitivity to nearly all alignment degrees of freedom. The polarimeter also greatly reduces vibration sensitivity, removes the need for time-sequential measurements, and has reduced cross-talk between polarization channels compared to other schemes. The polarimeter further minimizes sensitivity to parallax effects, and unambiguously separates intensity and polarization measurements on the focal-plane array (FPA) or image plane.

The polarimeter design facilitates compact implementations, and can simultaneously measure all polarization components. Because some embodiments of the polarimeter have no absorbing or reflective optical elements, the polarimeter is more efficient than designs that use absorbing polarization elements such as wire-grid polarizers. The lack of moving parts makes the polarimeter more robust than many existing concepts. The polarimeter may also be applied to a wide range of wavelengths, including infrared where cryogenic operation is required.

Figure 1A:
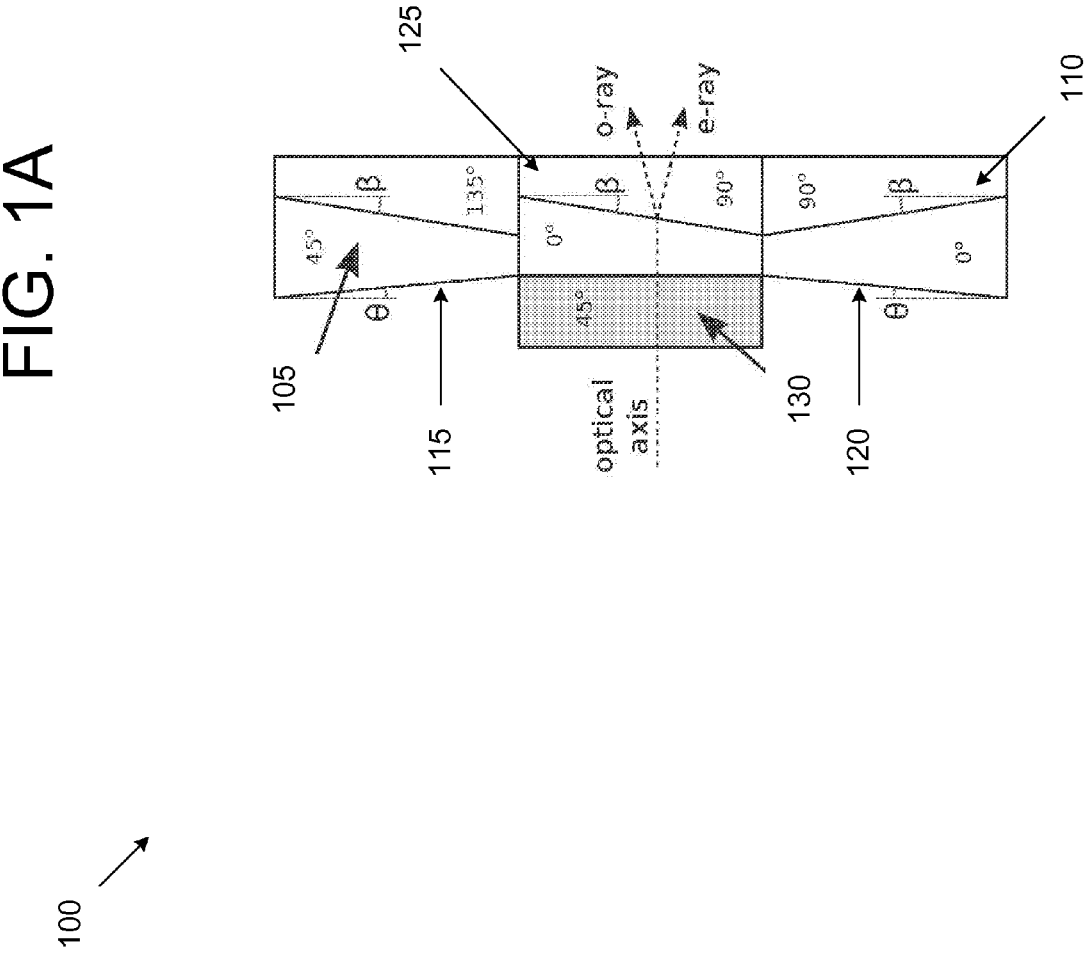
FIGS. 1A and 1B illustrate a side view and a front view, respectively, of a triple Wollaston prism, according to an embodiment of the present invention.
Figure 1B:
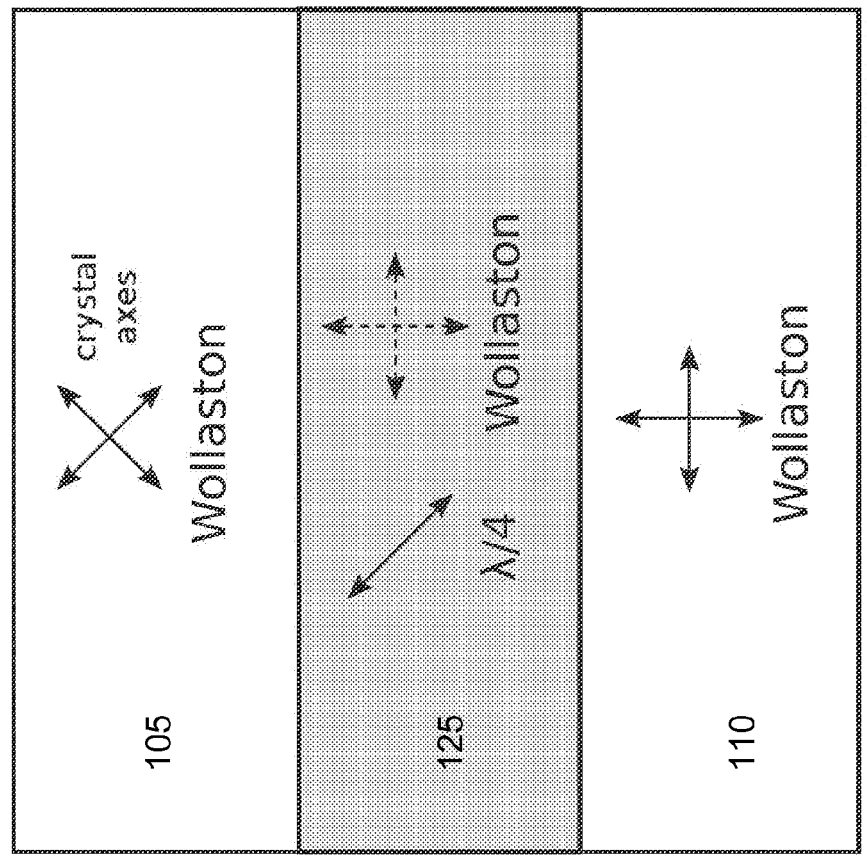

FIGS. 1A and 1B illustrate a side view and a front view, respectively, of a triple Wollaston prism 100, according to an embodiment of the present invention. In this embodiment, a prism assembly may include outer prisms 105, 110 and a central prism 125. Outer prism 105 may include a wedge 115, and outer prism 110 may include a wedge 120. Central prism 125 may be attached to a quarter-wave plate (QWP) 130 to transform (or convert) the light from circular light to linear light for subsequent analysis by the Wollaston prism.

It should be appreciated that QWP 130 may include a crystal axis that is oriented 45° with respect to a crystal axis of central prism 125. The crystal axes of outer prisms 105, 110 may be aligned at 45° with respect to one another. The arrows shown in FIG. 1B indicate the relative orientation of the crystal axes of each prism 105, 110, and 125.

In order to redirect light emitted from outer prisms 105, 110, wedges 115, 120 may be attached to (see FIG. 2), or built-in to (see FIG. 1A), outer prisms 105, 110. Wedges 115, 120 may include an angle θ such that the outputted light from each prism 105, 125, 110 does not overlap. Stated differently, angle θ determines the separation between the respective outputted light of prisms 105, 125, 110. This may allow the outputted light to be transmitted to a corresponding location (or point) on an image plane. A discussion of the image plane will be provided in more detail below.

In certain embodiments, each prism 105, 110, and 125 may be composed of birefringent material (or uniaxial birefringent crystals). Each prism pair 105, 110, and 125 as shown in FIG. 1A may be cut from a single crystal axis, and reoriented so that the members of each pair may be rotated 90 degrees with respect to each other, as shown in FIGS. 1A and 1B. The cut may allow the crystal axis to be orthogonal to the optical axis (e.g., system axis) along which the collimated light propagates. The angular deviation between orthogonal pairs of polarization states may be determined by angle β in each prism 105, 110, and 115.

It should be appreciated that light matter interaction with a solid surface, liquid interface, or gas may alter the amplitude and phase of polarization states in a way that depends on material properties. For example, conductive materials have a complex index of refraction that may cause a phase-shift between orthogonal polarization states, generating elliptically polarized light. This effect can provide contrast between conductive and non-conductive matter, enabling material discrimination and information for artificial (man-made) object detection, or possibly distributed earth detection. In order to exploit these phenomena, an imaging-polarimeter having a prism assembly, as shown in FIG. 1, may be beneficial.

FIG. 2, for example, illustrates an imaging polarimeter 200, according to an embodiment of the present invention. In this embodiment, when a 2-dimensional image is projected onto entrance slit 205, a portion of the image (e.g., a 1-dimensional image) is transmitted through entrance slit 205. Entrance slit 205 may be a narrow slit, transmitting light to a first lens 210 that is configured to collimate the light.

The type of lens that is utilized may depend on the desired imaging resolution and the application of imaging polarimeter 200. It should be appreciated that, in this embodiment, the distance between entrance slit 205 and first lens 210 is approximately one focal length. However, the actual distance may depend upon the overall scale of imaging polarimeter 200. The first lens 210 may collimate the light, such that the rays of light (e.g., k vectors) may be transmitted in parallel to the optical axis or approximately normal incidence to each prism 220, 225, 230. Stated differently, first lens 210 may convert the spatial distribution of light from entrance slit 205 to an angular distribution and transmit the converted light to each prism 220, 225, 230.

While the prism assembly in this embodiment includes three prisms, depending on the application of the imaging polarimeter, other embodiments may include more or less than three prisms. Because each prism 220, 225, 230 includes elements that are sensitive to the polarization state of light, each prism 220, 225, 230 may be configured to split the light into two discrete directions. The weight, i.e., the intensity, of light that is split depends on the polarization state of the light.

To prevent a parallel output of light from each prism 220, 225, 230, wedges 235, 240 may be attached, or built-in, to prisms 220, 230, respectively. By utilizing wedges 235, 240, the directions of the light emitted from outer prisms 220 and 230 are different from each other and are also different from the light emitted from central prism 225. As a result, this may allow polarization projections to be measured at 0°, 90°, 45°, and 135° from top to bottom on image plane 250.

To obtain projection information for left hand circular polarization (LHC) and right hand circular polarization (RHC), QWP 245 may be attached to central prism 225. As discussed above, QWP 245 converts the circular component of light to linear, and vice versa. This may allow the weights of the LHC and RHC to be measured at LHC and RHC points on image plane 250. Stated differently, prisms 220, 225, 230 may create an angular displacement that depends on the polarization state of the light.

After the light is split by each prism 220, 225, 230, the light is captured by second lens 215. Second lens 215 may convert the angular distribution of the light into a spatial distribution and redirect the light to respective 1-dimensional polarization images on image plane 250 to create a complete characterization of the polarization state (e.g., Stokes vectors) of the light throughout the image. In this embodiment, FIG. 2 illustrates that the split light from central prism 225 is directed by second lens 215 to RHC. However, it should be noted that the light split from each prism may be directed to various locations on image plane 250, that is, to the 0 degree location, 90 degree location, RHC location, LHC location, 45 degree location, and/or 135 degree location.

It should also be appreciated that this technique may be applied until the entire 2-dimensional image is captured by imaging polarimeter 200. For example, the polarization images may be built up by scanning the 2-dimensional image across slit to acquire multiple 1-dimensional images, and then reconstructing the 2-dimensional polarization images. Scanning the 2-dimensional image across slit 205 may be accomplished using various optical elements that precede slit 205, such as moving the front-end telescope transverse to the optical axis, or by the motion of the polarimeter platform itself (e.g. aircraft or satellite motion).

This may technique allows intensity and polarization state of each pixel in the image to be measured using, for example, the Stokes parameter:

$$S = \begin{bmatrix} S_0 \\ S_1 \\ S_2 \\ S_3 \end{bmatrix} \propto \begin{bmatrix} I_0 + I_{90} \\ I_0 - I_{90} \\ I_{45} - I_{135} \\ I_L - I_R \end{bmatrix}$$

where I is the intensity at the different locations on the image plane, $S_0$ is proportional to intensity, and $S_1$, $S_2$, $S_3$ provide information about the polarization state. The Stokes parameters differentially measure non-orthogonal projections of polarization, unambiguously distinguish between different polarization states, reduce experimental systematic errors, and completely characterize the polarization state of light.

It should be noted that first and second lens 210, 215 may perform a Fourier transform, i.e., transform angle information into position information. The distance between slit 205 and lens 210, and similarly the distance between lens 215 and image plane 250, is the focal length of the corresponding lens. However, the focal lengths of the two lenses are not necessarily equal. The distance between first lens 210 and second lens 215, as well as the distance between first lens 210 and each prism 220, 225, 230 and the distance between second lens 215 and each prism 220, 225, 230 may be any distance that would be appreciated by a person of ordinary skill in the art.

Figure 3:
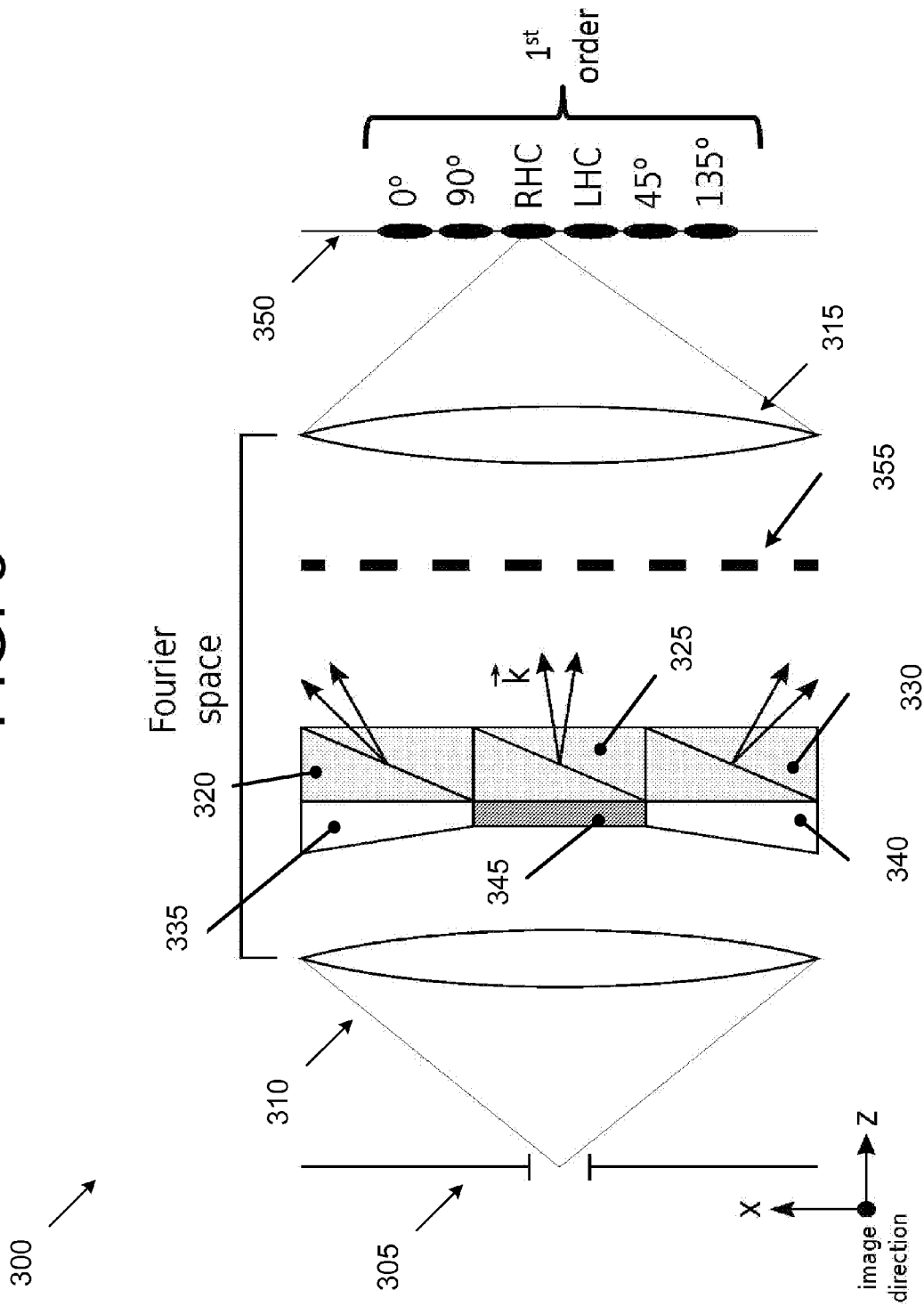
FIG. 3 illustrates an imaging spectropolarimeter, according to an embodiment of the present invention.

As discussed above, the embodiments in FIG. 2 provide intensity and polarization information of an image. However, in other embodiments, information such as intensity, polarization, and wavelength content of an image may be obtained by utilizing, for example, a diffraction grating unit. FIG. 3, for example, illustrates an imaging spectropolarimeter 300, according to an embodiment of the present invention. Imaging spectropolarimeter 300 may include similar components to imaging polarimeter 200, such as entrance slit 305, a first lens 310, second lens 315, a plurality of prisms 320, 325, 330, wedges 335, 340, QWP 345, and an image plane 350.

However, unlike imaging polarimeter 200 of FIG. 2, imaging spectropolarimeter 300 may include a diffraction grating unit 355 configured to smear out each polarization channel according to its spectral content. For example, the array of six locations (0°, 90°, RHC, LHC, 45°, and 135°) on image plane 350 are smeared or spread according to spectral content. As a result, this embodiment may simultaneously provide intensity, polarization, and wavelength content (or spectroscopic information) of the image. It should be noted that the spectroscopic information may be along the x-direction (e.g., how the spots are smeared out), each location on image plane 350 provides polarization information, and image information may be along a y-direction.

In some embodiments, a non-imaging polarimeter may be provided to measure the intensity in each polarization. FIG. 4, for example, illustrates a non-imaging polarimeter 400, according to an embodiment of the present invention. In this embodiment, when data is captured, collimated light is transmitted orthogonal to prism assembly 405 for analysis. Prism assembly 405 may include outer prisms 410, 420 having wedges 425, 430 to split the light and direct the split light from outer prisms 410, 420 to lens 440. Similarly, central prism 415 having a QWP 435 may also split the light and direct the split light to lens 440. Lens 440 may capture the split light from each prism 410, 415, 420 and direct the split light to respective locations (0°, 90°, RHC, LHC, 45°, and) 135° on an image sensor array 450 to allow intensity in each polarization state to be measured.

However, to increase the speed of measurement, some embodiments may include high-speed detectors rather than an imaging plane. FIG. 5, for example, illustrates a high-speed non-imaging polarimeter 500, according to an embodiment of the present invention. Similar to FIG. 4, collimated light from an image is transmitted orthogonal to a prism assembly 505. Prism assembly 505 having prisms 510, 515, 520, wedges 525, 530, and QWP 535 may be configured to split the collimated light according to the polarization state. The split light from each prism 510, 515, and 520 is captured by lens 540 and directed to, for example, six high-speed detectors 550. Each individual high-speed detector 550 may collect the split light from each of the six output channels to allow measurement of the intensity in each polarization state to be obtained.

It should be appreciated that one or more embodiments pertain to a imaging-polarimeter configured to measure linear and circular polarization components of light simultaneously. The polarimeter may contain no moving parts, and may be suitable for space-borne or air-borne sensor platforms. The polarimeter may be applied to a range of wavelengths, for example, visible or infrared wavelengths, which may also require cryogenic operation. The polarimeter may also enable material discrimination, contrast enhancement, and diagnostic capabilities that can be exploited for defense, earth-science, space-science, and quality control applications.

The polarimeter may include a triple Wollaston prism assembly configured to measure a complete set of polarization projections, unambiguously characterizing the polarization state of light. In some embodiments, the polarimeter may only include a portion of the assembly in FIGS. 1A and 1B, if a subset of the polarization information is required for a particular application.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:
1. An apparatus for an imaging system, comprising:
a Wollaston prism assembly comprising a plurality of prisms, each of the plurality of prisms configured to receive light and split the light into two different directions according to a polarization state; and
a lens configured to redirect the split light from each of the plurality of prisms to respective locations on an image plane, wherein each of the plurality of prisms is cut at an angle β, resulting in an internal interface angle that is oblique to a system axis of the Wollaston prism assembly, to determine an angular deviation between orthogonal pairs of polarization states, the prism assembly further comprises a first outer prism comprising a wedge and second outer prism comprising a wedge, the wedge of the first outer prism and the wedge of the second outer prism having an angle θ, resulting in an external interface angle that is oblique to the system axis of the Wollaston prism assembly, that prevents the spit light from overlapping, and the first outer prism and the second outer prism are arranged in parallel with respect to the system axis of the Wollaston prism assembly, the system axis is a z-direction that the light propagates.

2. The apparatus of claim 1, wherein the Wollaston prism assembly further comprises:
a crystal axes of the first outer prism is aligned at a predefined angle with respect to the second outer prism.

3. The apparatus of claim 2, wherein the wedge of the first outer prism is configured to cause the split light to emit from the first outer prism in a direction different than light split from other prisms.

4. The apparatus of claim 2, wherein the wedge of the second outer prism is configured to cause split light to emit from the second outer prism in a direction different than light split from other prisms.

5. The apparatus of claim 1, wherein the Wollaston prism assembly further comprises a central prism operably connected to a quarter wave plate.

6. The apparatus of claim 5, wherein the quarter wave plate having a crystal axis oriented at a predefined angle with respect to a crystal axis of the central prism, and is configured to convert light received at the central prism from circular light to linear light.

7. The apparatus of claim 1, further comprising:
a slit configured to project light from a portion of a captured image to another lens.

8. The apparatus of claim 7, wherein the other lens is configured to receive the projected light and collimate the projected light towards the prism assembly.

9. The apparatus of claim 1, wherein each of the plurality of prisms is cut from a crystal to form two members in each of the plurality of prisms,
the cut allows a crystal axis to be orthogonal to the system axis along which the light propagates, and
the two members in each of the plurality of prisms are rotated at a predefined angle with respect to each other.

10. An apparatus for an imaging system, comprising:
a Wollaston prism assembly comprising a central prism attached to a quarter wave plate, and two outer prisms having a wedge, wherein
the central prism and the two outer prisms are configured to receive collimated light and split the collimated light in different directions according to a polarization state,
the central prism and the two outer prisms are cut at an angle β, resulting in an internal interface angle that is oblique to a system axis of the Wollaston prism assembly, to determine an angular deviation between orthogonal pairs of polarization states,
the wedge of each of the two outer prisms has an angle θ, resulting in an external interface angle that is oblique to the system axis of the Wollaston prism assembly, that prevents the split collimated light from overlapping,
the two outer prisms and the central prism are arranged in parallel with respect to the system axis of the Wollaston prism assembly and on opposite sides of the central prism, and
the system axis is a z-direction that the light propagates.

11. The apparatus of claim 10, wherein the Wollaston prism assembly is further configured to receive the collimated light from a scene or optical beam.

12. The apparatus of claim 10, wherein the Wollaston prism assembly is further configured to receive the collimated light from a first lens.

13. The apparatus of claim 12, wherein the first lens is configured to receive projected light of a portion of a captured image from an entrance slit and collimate the projected light.

14. The apparatus of claim 12, wherein the wedges of each of the two outer prisms are configured to cause the split light from the two outer prisms to transmit in different directions.

15. The apparatus of claim 10, wherein the split light from the central prism and the two outer prisms is configured to be transmitted to a second lens.

16. The apparatus of claim 15, wherein the second lens is configured to redirect split light to respective locations on an image plane.

17. The apparatus of claim 15, wherein the second lens is configured to redirect the split light to corresponding sensors or detectors.

18. The apparatus of claim 10, wherein each prism is cut from a crystal to form two members in each prism,
the cut allows a crystal axis to be orthogonal to the system axis along which the collimated light propagates, and
the two members in each prism are rotated at a predefined angle with respect to each other.

19. An apparatus for an imaging system, comprising:
a Wollaston prism assembly configured to receive collimated light and split the light into different directions according to a polarization state; and
a lens configured to receive the split collimated light from the prism assembly and focus the split collimated light to different polarization channels on an image plane to obtain information for circular and linear polarization of the received collimated light, wherein
the Wollaston prism assembly comprises:
a plurality of prisms, each of the plurality of prisms cut at an angle β, resulting in an internal interface angle that is oblique to a system axis of the Wollaston prism assembly, to determine an angular deviation between an orthogonal pair of polarization states,
two outer prisms of the plurality of prisms arranged in parallel with respect to the system axis of the Wollaston prism assembly and have a wedge with an angle θ, resulting in an external interface angle that oblique to the system axis of the Wollaston prism assembly, that prevents the split collimated light from overlapping, and
the system axis is a z-direction that the light propagates.

20. The apparatus of claim 19, further comprising:
an entrance slit configured to project light captured from a portion of an image to another lens.

21. The apparatus of claim 20, wherein the other lens is configured to collimate the projected light and transmit the projected collimated light to the prism assembly.

22. The apparatus of claim 19, further comprising:
a diffraction grating element configured to spread the split collimated light on each polarization channel according to its respective spectral content to obtain intensity, polarization, and wavelength content of light.

23. The apparatus of claim 19, wherein each prism in the Wollaston prism assembly is cut from a crystal to form two members in each prism, and
the two members in each prism are rotated at a predefined angle with respect to each other.

\* \* \* \* \*